(12) United States Patent
Jie

(10) Patent No.: US 9,283,136 B2
(45) Date of Patent: Mar. 15, 2016

(54) WALKING AID

(71) Applicant: FUJIAN SECURE MEDICAL TECHNOLOGY CO. LTD, Fuzhou, Fujian (CN)

(72) Inventor: Yebing Jie, Fujian (CN)

(73) Assignee: Fujian Secure Medical Technology Co. Ltd., Fujian (CN)

( * ) Notice: Subject to any disclaimer, the term of this patent is extended or adjusted under 35 U.S.C. 154(b) by 0 days.

(21) Appl. No.: 14/763,205

(22) PCT Filed: Jan. 25, 2013

(86) PCT No.: PCT/CN2013/071006
§ 371 (c)(1),
(2) Date: Jul. 24, 2015

(87) PCT Pub. No.: WO2014/113981
PCT Pub. Date: Jul. 31, 2014

(65) Prior Publication Data
US 2016/0000636 A1    Jan. 7, 2016

(51) Int. Cl.
*B62B 5/04* (2006.01)
*A61H 3/04* (2006.01)
(Continued)

(52) U.S. Cl.
CPC .............. *A61H 3/04* (2013.01); *B60B 33/0089* (2013.01); *B60B 33/063* (2013.01); *B62B 5/049* (2013.01); *A61H 2003/046* (2013.01)

(58) Field of Classification Search
CPC .............. A61H 3/04; A61H 2003/046; B60B 33/0089; B60B 33/063; Y10T 16/212; Y10T 16/216; A45B 1/02; B62B 5/049
See application file for complete search history.

(56) References Cited

U.S. PATENT DOCUMENTS 2,613,389 A * 10/1952 Cramer .................. B60B 33/06
16/18 CG
3,350,095 A * 10/1967 Clasen ..................... A61H 3/04
16/44
(Continued)

FOREIGN PATENT DOCUMENTS

CN            2912606        6/2007
CN          201734912        2/2011
(Continued)

OTHER PUBLICATIONS

International Search Report filed in PCT/CN2013/071006 mailed Nov. 7, 2013.

*Primary Examiner* — Katy M Ebner
*Assistant Examiner* — Emma K Frick
(74) *Attorney, Agent, or Firm* — Rankin, Hill & Clark LLP

(57) ABSTRACT

The present invention relates to the walking aid field. The present invention provides a walking aid, including a support frame, with a plurality of support legs disposed at a bottom of the support frame, and omni-directional wheels disposed on the support legs, wherein a buffering structure is further disposed between each support leg and each omni-directional wheel. In the walking aid provided by the present invention, a buffering structure is disposed between a support frame structure and an omni-directional wheel of the walking aid. On the one hand, the buffering structure may have a buffering effect in use of the entire walking aid, and when the walking aid contacts the ground, can act as a buffer to reduce physical energy consumption of a user in use of the walking aid, and lessen discomfort of the user as much as possible; on the other hand, when the walking aid stops moving, the buffering structure can better support the walking aid securely on the ground, and when the walking aid stops, apply force downward to the walking aid, so that four effective contacts are formed by the casing of the buffering structure.

4 Claims, 5 Drawing Sheets

(51) Int. Cl.
*B60B 33/06* (2006.01)
*B60B 33/00* (2006.01)

(56) References Cited

U.S. PATENT DOCUMENTS

| | | | | |
|---|---|---|---|---|
| 3,441,974 A | * | 5/1969 | Dean | A47B 91/028 16/18 R |
| 3,758,918 A | * | 9/1973 | Bruun | B60B 33/0089 16/44 |
| 4,046,374 A | * | 9/1977 | Breyley | A61H 3/04 280/42 |
| 4,621,804 A | | 11/1986 | Mueller | |
| 4,700,430 A | * | 10/1987 | Raftery | A47B 91/06 16/18 CG |
| 4,800,617 A | * | 1/1989 | Yeh | B60B 33/0089 16/18 CG |
| 4,941,496 A | * | 7/1990 | Berning | A61H 3/04 135/67 |
| 5,001,808 A | * | 3/1991 | Chung | B60B 33/06 16/18 CG |
| 5,020,560 A | * | 6/1991 | Turbeville | A61H 3/04 135/67 |
| 5,350,151 A | * | 9/1994 | Aoki | A47B 91/04 248/188.3 |
| 5,647,602 A | * | 7/1997 | Nevin | A61H 3/04 135/67 |
| 5,794,639 A | * | 8/1998 | Einbinder | A61H 3/04 135/66 |
| 5,800,318 A | * | 9/1998 | Coviello | A61H 3/04 135/67 |
| 6,089,666 A | * | 7/2000 | Rosko | A47C 7/006 16/44 |
| 6,439,250 B1 | * | 8/2002 | Balan | A61H 3/008 135/66 |
| 6,473,935 B1 | * | 11/2002 | Cherukuri | B60B 33/0005 16/33 |
| 6,594,856 B1 | * | 7/2003 | Cherukuri | B60B 33/0005 16/32 |
| 6,733,018 B2 | * | 5/2004 | Razon | A61H 3/008 135/67 |
| 7,261,114 B2 | * | 8/2007 | Karasin | A61H 3/00 135/85 |
| 7,992,584 B1 | * | 8/2011 | Birnbaum | A61H 3/04 135/67 |
| 8,087,126 B2 | * | 1/2012 | Duvert | A47D 7/00 16/18 CG |
| 8,484,801 B2 | * | 7/2013 | Li | B60B 7/02 16/18 CG |
| 9,016,297 B2 | * | 4/2015 | Salomon | A45B 1/02 135/66 |
| 2003/0094191 A1 | | 5/2003 | Lin | |

FOREIGN PATENT DOCUMENTS

| | | |
|---|---|---|
| CN | 102973393 | 3/2013 |
| CN | 203089790 | 7/2013 |
| JP | 2012-115437 | 6/2012 |

* cited by examiner

WALKING AID

TECHNICAL FIELD

The present invention relates to a walking aid, and in particular, to a walking aid with controllable walking aid wheels.

BACKGROUND

A walking aid is a tool which, by means of support of a device, enables a person who has difficulty in walking or loses the ability of working, to walk easily and go out for a walk like a normal person. It is generally made up of aluminum alloy materials, and is a triangular metal frame with four fulcrums, protecting a patient therein and supporting the body of the patient for ease of standing or walking. It has advantages of light weight, firm support, ease of adjustment, and being foldable. Therefore, it is extensively used by people who have difficulty in walking or lose the ability of working. However, an ordinary four-fulcrum walking aid requires that the walking aid should be lifted in every step. If the walking aid is used by an old person or a patient, and the walking aid cannot be lifted smoothly due to physical discomfort or weakness, great inconvenience is caused to walking. Therefore, for ease of use, it is necessary to dispose movable wheels on four fulcrums of a conventional four-fulcrum walking aid. However, braking is needed when the walking aid with wheels moves, and a misoperation is frequently caused in hand control and movement, resulting a fall-down and a second injury.

SUMMARY

The technical problem to be solved by the present invention is to overcome the disadvantages of the prior art and provide a walking aid that can facilitate and assist a patient in walking, avoid the discomfort, fall-down, and second injury that are caused by improper control or use of the walking aid, and reduce physical energy consumption.

To solve the technical problem, the technical solution of the present invention is as follows: A walking aid includes a support frame, with a plurality of support legs disposed at the bottom of the support frame, and omni-directional wheels disposed on the support legs, where a buffering structure is further disposed between each support leg and each omni-directional wheel, and the buffering structure includes a casing for fixedly sleeving the bottom of the support leg and an elastic component that is disposed in the casing and fixedly connected to the omni-directional wheel.

Specifically, a connecting end for cooperating with the support leg is disposed on the top of the casing, where the connecting end is inserted in the support leg.

Specifically, the elastic component includes a movable shaft inserted in the casing, a limiting movable block that is fixedly disposed at one end of the movable shaft and fixedly connected to the omni-directional wheel, and an elastic element that is disposed between the movable shaft and the limiting movable block.

Further, a first channel for the movable shaft to pass through is disposed in the casing, the movable shaft is inserted in the first channel, and a butting top surface is disposed on the top of the movable shaft, where the butting top surface butts a top surface of the casing.

Further, a second channel connected to the first channel and a third channel connected to the second channel are further disposed in the casing, where a first step-like surface is formed between the second channel and the first channel, a second step-like surface is formed between the second channel and the third channel, and the limiting movable block includes a movable block that is disposed in the third channel and capable of butting the second step-like surface, and a sleeve that is vertical to the movable block and disposed in the second channel, where one end of the movable shaft is fixedly disposed in the sleeve, and a shaft lever of the omni-directional wheel is fixedly disposed in the sleeve.

Still further, the elastic element is disposed in the second channel and surrounds the movable shaft and an exterior of the sleeve of the limiting movable block, where one end of the elastic element butts the first step-like surface, and the other end butts a top surface of the movable block.

Specifically, the elastic element is a compression spring.

Beneficial effects of the present invention are as follows: In the walking aid provided by the present invention, a buffering structure is disposed between a support frame structure and an omni-directional wheel of the walking aid. On the one hand, if the walking aid is used in road conditions with complex terrains, such as bumpy road segments or stairways, the buffering structure can have a buffering effect on the omni-directional wheel in use of the entire walking aid, and when the walking aid contacts the ground, can act as a buffer to reduce physical energy consumption of a user in use of the walking aid, and lessen discomfort of the user as much as possible; on the other hand, when the walking aid stops moving, the buffering structure can better support the walking aid securely on the ground, and when the walking aid stops, apply force downward to the walking aid, so that four effective contacts are formed by the casing of the buffering structure. Therefore, the walking aid can be fixed on the ground more effectively. Therefore, the walking aid is more adaptive to a use manner of the user, focuses more on use experience of the user, and avoids, as much as possible, inconvenience of control of omni-directional wheels when the user uses the walking aid with omni-directional wheels.

Figure 1:
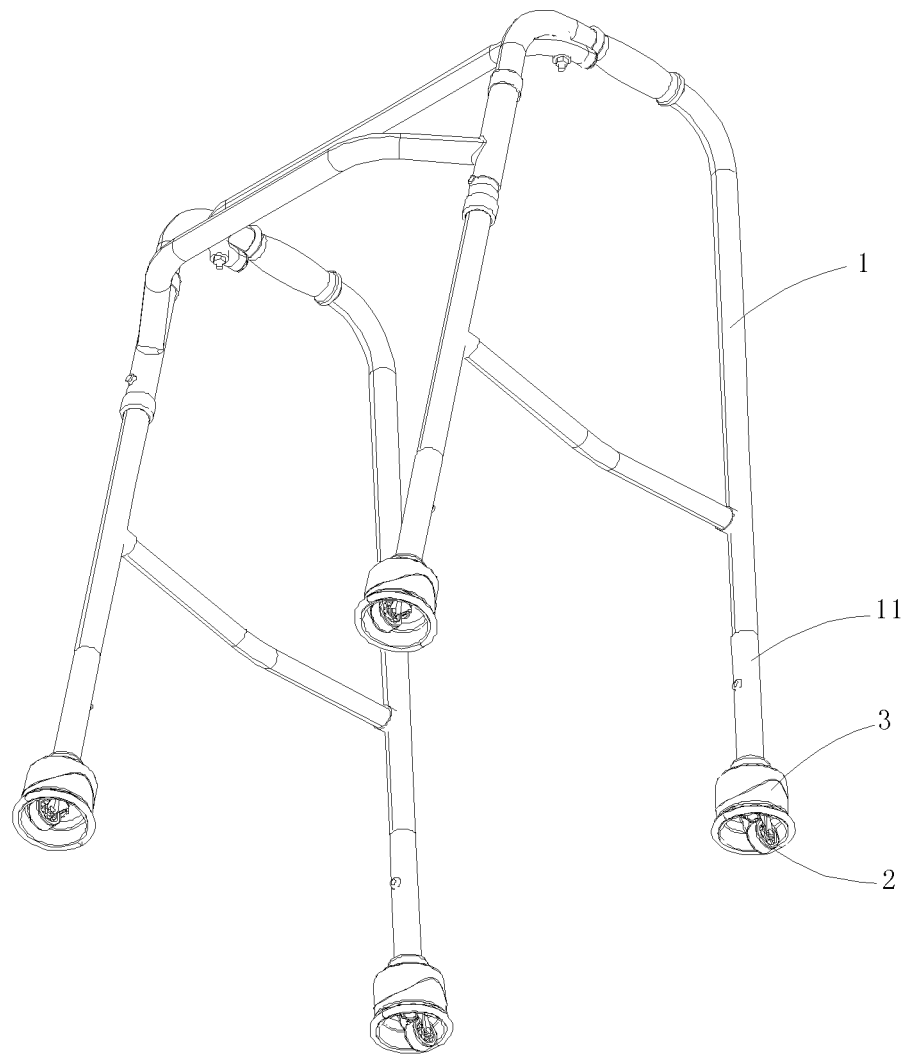
FIG. 1 is a three-dimensional schematic view of a structure of a walking aid according to an embodiment of the present invention.
Figure 2:
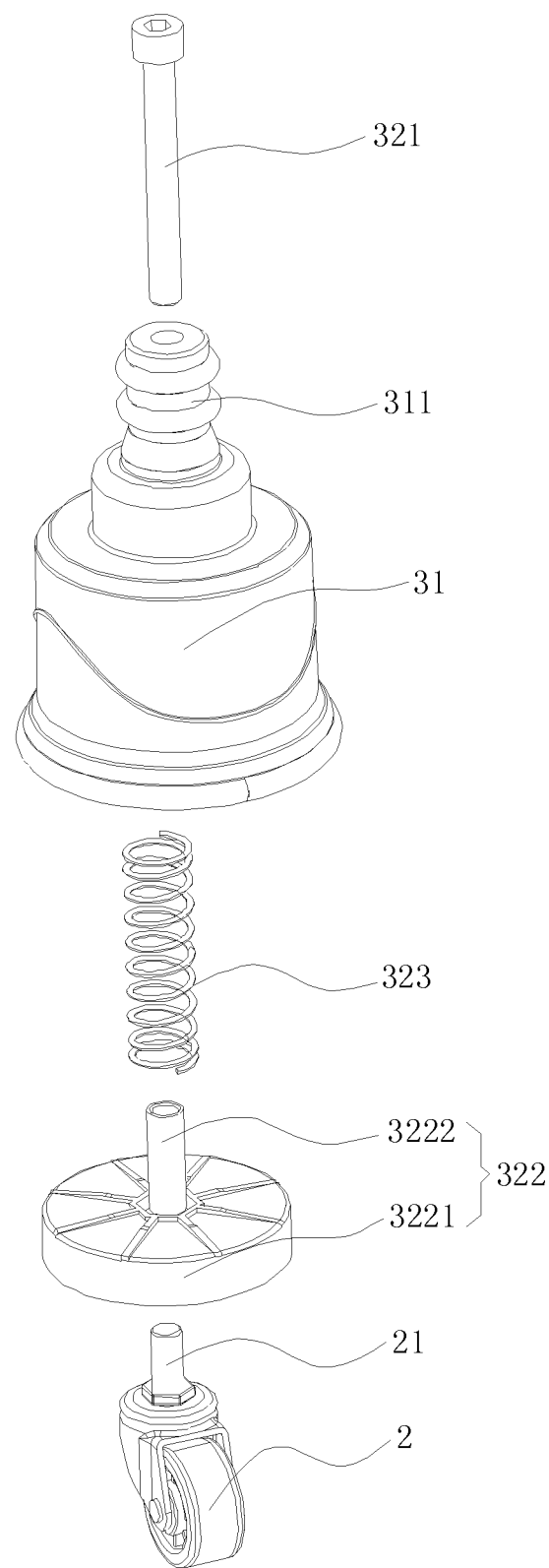
FIG. 2 is a schematic view of decomposition of a buffering structure of a walking aid according to an embodiment of the present invention.

In the drawings:
1—support frame 11—support leg
2—omni-directional wheel 21—shaft lever of omni-directional wheel
3—buffering structure 31—casing 311—connecting end
   3111—ring groove
312—top surface 313—first channel 314—second channel
   315—third channel
316—first step-like surface 317—second step-like surface
   318—elastic rubber ring
32—elastic component 321—movable shaft
3211—butting top surface of movable shaft 3212—bottom of movable shaft 322—limiting movable block 3221—movable block
3222—sleeve
323—elastic element

DESCRIPTION OF EMBODIMENTS

To make the objectives, technical solutions, and advantages of the present invention more comprehensible, the following describes the present invention in detail with reference to embodiments and accompanying drawings. It should be understood that the embodiments described herein are merely specific embodiments for explaining the present invention but not intended to limit the present invention.

Referring to FIG. 1 to FIG. 5, the present invention provides a walking aid. The walking aid provided by the present invention includes a support frame 1, with a plurality of support legs 11 disposed at the bottom of the support frame 1, and omni-directional wheels 2 disposed on the support legs 11, where a buffering structure 3 is further disposed between each support leg 11 and each omni-directional wheel 2. Specifically, referring to FIG. 2 to FIG. 4, the buffering structure 3 includes a casing 31 for fixedly sleeving the bottom of the support leg 11 and an elastic component 32 that is disposed in the casing 31 and fixedly connected to the omni-directional wheel 2. The walking aid provided by the present invention is mainly intended for use by old persons and patients who have difficulty in walking, so that they can walk by themselves with the help of the walking aid. The walking aid can provide auxiliary support for a user. When moving forward, the user only needs to push the support frame of the walking aid forward, and with the push, the omni-directional wheels at the bottom of the walking aid can move forward. After the walking aid is pushed over a distance, if the user stops applying force forward, the omni-directional wheels stop moving, and the entire walking aid stops. It is unnecessary to lift the entire walking aid and then drop it forward for fixing, which is different from the conventional moving manner. The buffering structure 3 provided in the walking aid provided by the present invention is mainly intended for use by the user in road conditions with complex terrains, such as bumpy road segments or stairways, and can have a buffering effect on the omni-directional wheel 2, so that the entire walking aid can move more stably. The buffering structure 3 can act as a buffer for the walking aid and the user using the walking aid, can reduce the impact of bumpy roads or hard objects on the walking aid, and can reduce physical energy consumption of the user in use of the walking aid as much as possible and lessen discomfort of the user as much as possible.

When force is applied downward to the walking aid, force is applied to the casing 31 of the buffering structure 3 through the support leg 11 of the support frame 1, so that the casing 31 moves downward. Specifically, in the present invention, four support legs 11 are disposed on the support frame 1, and a buffering structure 3 is disposed at a junction between each support leg 11 and each omni-directional wheel 2. The casing 31 of the buffering structure 3 can better support the walking aid securely on the ground when the walking aid stops moving. This is because when the user uses the walking aid, in every step, the walking aid is first pushed forward over a distance, and then the walking aid stops moving forward, and the user takes a step forward under the support of the walking aid, but when the walking aid stops, the user will certainly apply force downward to the walking aid to get the support of the walking aid, and then take a step forward and walk with the support of the walking aid. When the user applies force downward to the walking aid, the casing 31 of the buffering structure 3 at the bottom of the walking aid in the present invention is caused to move downward, and the casing 31 of the buffering structure 3 of the walking aid directly contacts the ground. In this manner, four effective contacts are formed, and the walking aid can be fixed on the ground more effectively. With the buffering structure 3, the walking aid is more adaptive to a use manner of the user and focuses more on use experience of the user. Situations in which a second injury is caused to the user because the omni-directional wheel 2 moves forward and cannot support the user due to improper use by the user or due to forward lean of the gravity center of the human body are completely avoided. When the walking aid stops, and the user is supported by the walking aid, the buffering structure can effectively provide the support, and control the omni-directional wheel 2 not to roll forward.

Specifically, a connecting end 311 for cooperating with the support leg 11 is disposed on the top of the casing 31, where the connecting end 311 is inserted in the support leg 11. Because the support leg 11 takes on a cylindrical structure, and the connecting end 311 of the buffering structure 3 also takes on a cylindrical structure, the connecting end 311 may be inserted in the support leg 11. Furthermore, two ring grooves 3111 are disposed at the connecting end 311, and a ring groove 3111 is also disposed at an edge of an exterior of the bottom of the casing 31, and an elastic rubber ring 318 is disposed in all the ring grooves 3111. The elastic rubber ring 318 has elasticity, and is disposed in the ring groove 3111. On the one hand, it can stably fix on the support leg 11 of the support frame 1 by interference fit between the entire buffering structure 3 and the support frame 1. On the other hand, it can reduce the impact of road conditions and the user on the walking aid as much as possible in a movement or stop process of the walking aid, and have a shock absorption effect.

Figure 3:
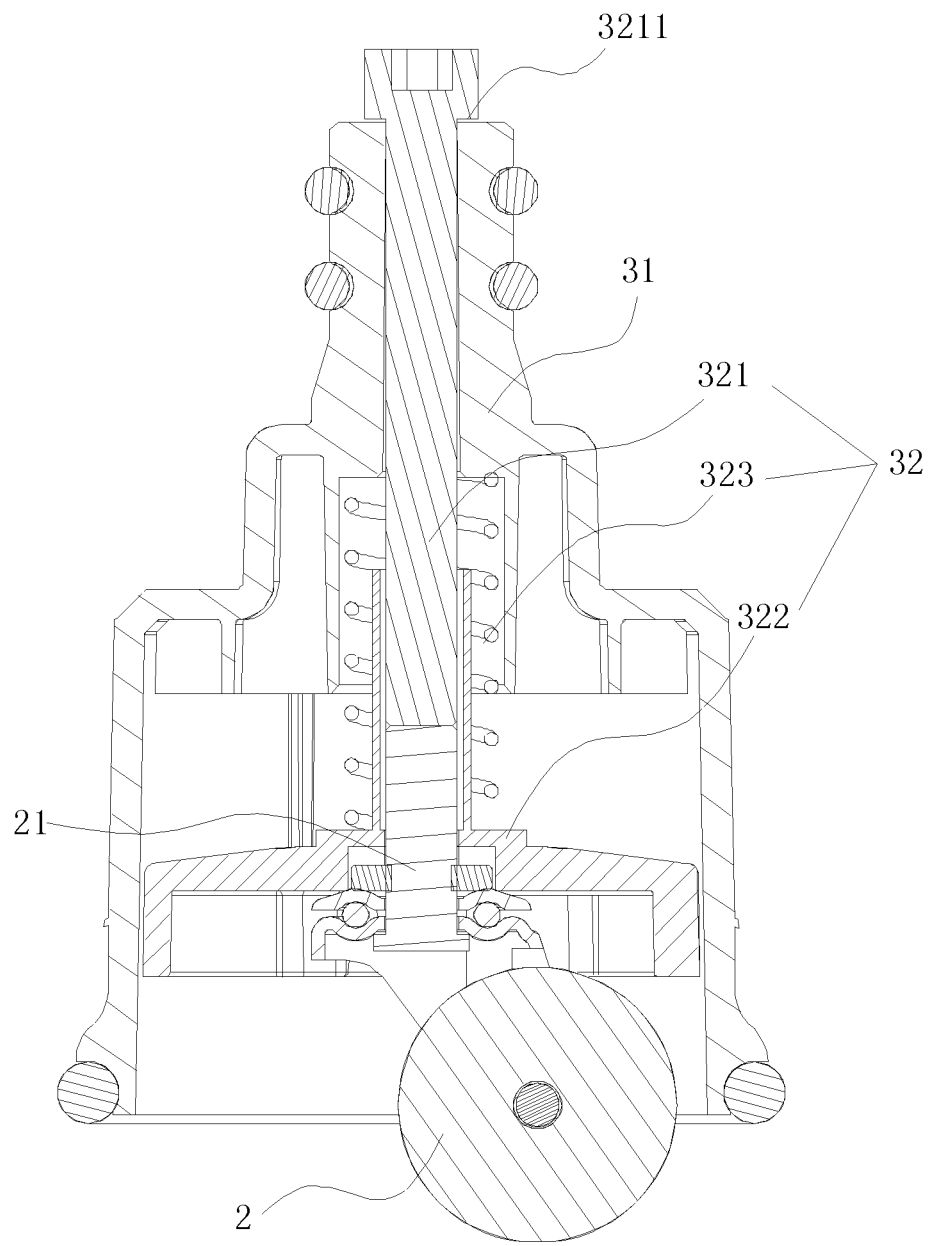
FIG. 3 is a complete sectional view of a buffering structure of a walking aid in walking according to an embodiment of the present invention.
Figure 4:
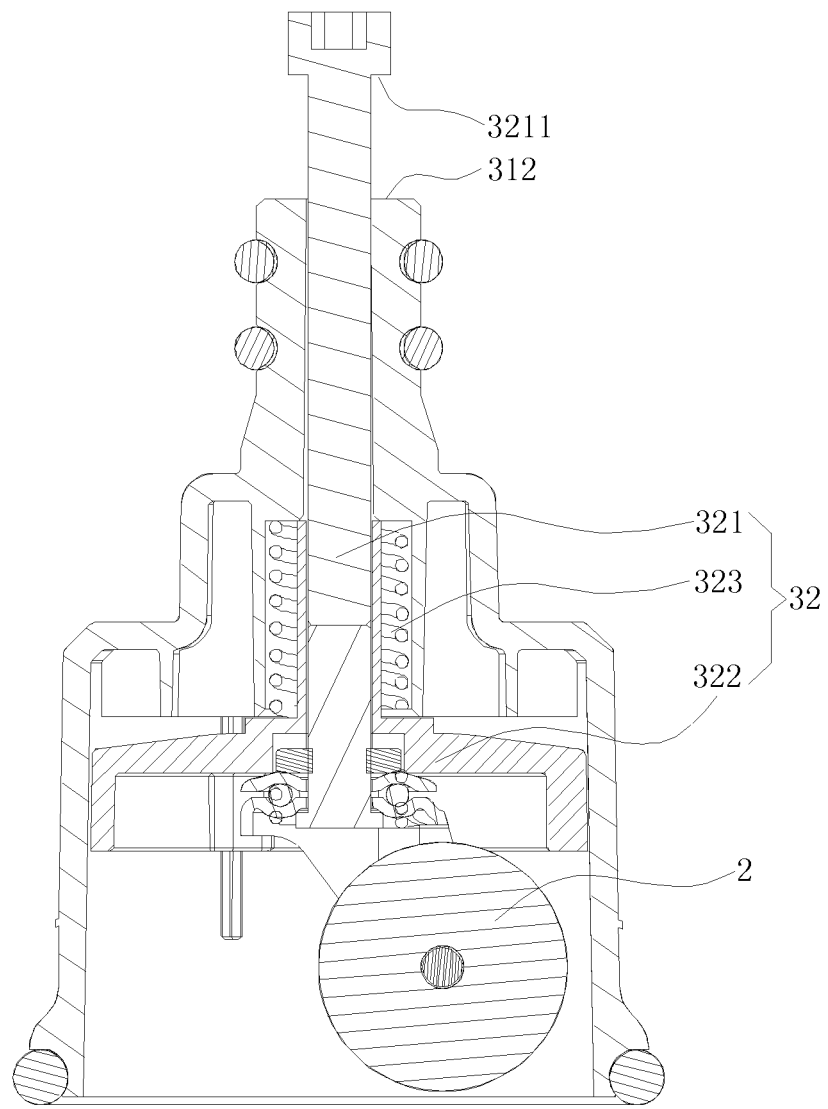
FIG. 4 is a complete sectional view of a buffering structure of a walking aid that stops according to an embodiment of the present invention.
Figure 5:
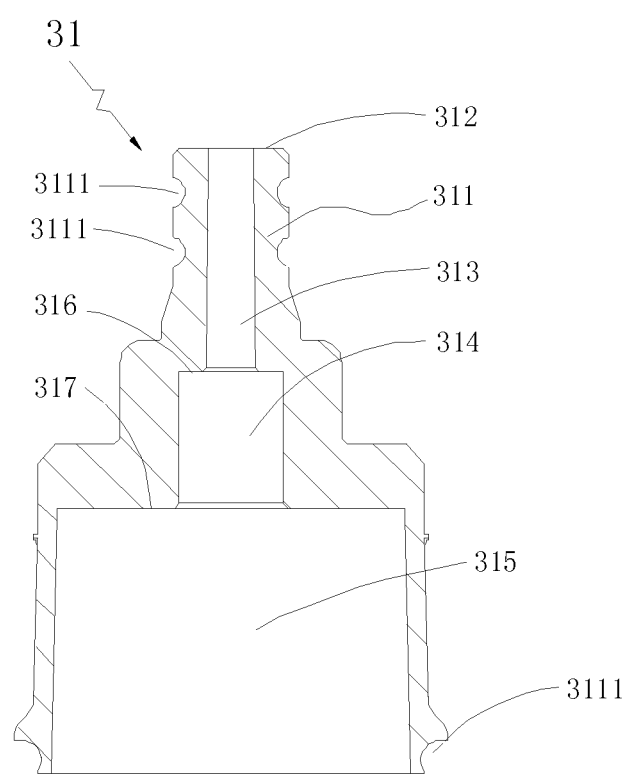
FIG. 5 is a complete sectional view of a casing of a buffering structure of a walking aid according to an embodiment of the present invention.

Further, still referring to FIG. 3 to FIG. 5, the elastic component 32 includes a movable shaft 321 inserted in the casing 31, a limiting movable block 322 that is fixedly disposed at one end of the movable shaft 321 and fixedly connected to the omni-directional wheel 2, and an elastic element 323 that is disposed between the movable shaft 321 and the limiting movable block 322. The limiting movable block 322 is fixedly connected to the movable shaft 321, while the movable shaft 321 is inserted in the casing 31 and the omni-directional wheel 2 is fixed on the limiting movable block 322. This ensures that the entire elastic component 32 and the connected omni-directional wheel 2 can be movably fixed on the casing 31. Driven by the elastic element 323, the movable shaft 321, the limiting movable block 322, and the connected omni-directional wheel 2 can move up and down relatively to the casing 31. When the elastic element 323 is in a loose state, the bottom of the casing 31 is higher than a contact surface between the omni-directional wheel 2 and the ground. In this case, the omni-directional wheel 2 may roll freely to push the walking aid to move. In this case, the buffering structure 3 is shown in FIG. 3. When the user presses the walking aid downward, the elastic element 323 is compressed by the downward force, so that the bottom of the casing 31 contacts the ground and is located at a same height as the bottom of the omni-directional wheel 2. In this case, the buffering structure is shown in FIG. 4. In this case, the omni-directional wheel 2 cannot roll, and the walking aid provides supporting force for the user, assisting the user in taking a step forward.

Specifically, a first channel 313 for the movable shaft 321 to pass through is disposed in the casing 31, the movable shaft 321 is inserted in the first channel 313, and a butting top surface 3211 is disposed on the top of the movable shaft 321, where the butting top surface 3211 butts a top surface 312 of the casing 31. The movable shaft 321 is inserted in a center of the casing 31. Due to the action of the butting top surface 3211, the movable shaft 321 has a lowest point relative to the casing 31, and the movable shaft 321 may move up in the first channel 313, that is, the limiting movable block 322 connected to the movable shaft 321 may move up in the casing 31 relatively to the casing 31, which also means that the omni-directional wheel 2 connected to the limiting movable block 322 can move up relatively to the casing 31. Relatively to the contacted ground, when force is applied downward to the walking aid, the support frame 1 of the walking aid drives the casing 31 of the buffering structure 3 to move downward. In this case, the elastic element 323 in the elastic component 32 is compressed, so that the casing 31 moves relatively to the omni-directional wheel 2, and thereby the bottom of the casing 31 drops to a same ground level as the bottom of the omni-directional wheel 2.

Further, a second channel 314 connected to the first channel 313 and a third channel 315 connected to the second channel 314 are further disposed in the casing 31, where a first step-like surface 316 is formed between the second channel 314 and the first channel 313, a second step-like surface 317 is formed between the second channel 314 and the third channel 315, and the limiting movable block 322 includes a movable block 3221 that is disposed in the third channel 315 and capable of butting the second step-like surface 317, and a sleeve 3222 that is vertical to the movable block 3221 and disposed in the second channel 314. In the present invention, the movable block 3221 and the sleeve 3222 are integrated, one end 3212 of the movable shaft 321 is fixedly disposed in the sleeve 3222, and a shaft lever 21 of the omni-directional wheel 2 is fixedly disposed in the sleeve 3222. The elastic element 323 is disposed in the second channel 314 and surrounds the movable shaft 321 and an exterior of the sleeve 3222 of the limiting movable block 322, where one end of the elastic element 323 butts the first step-like surface 316, and the other end butts a top surface of the movable block 3221. With the elastic element 323 disposed, the omni-directional wheel 2 connected to the limiting movable block 322 can move up and down relatively to the casing 31 to have a buffering effect. When the limiting movable block 322 abuts against the second step-like surface 317 in the casing 3, a distance of upward movement of the elastic component 32 is limited. Therefore, even if the omni-directional wheel 2 encounters a bumpy road, a highest point in the upward movement of the omni-directional wheel 2 is that the bottom of the omni-directional wheel 2 and the bottom of the casing 31 are on a same horizontal plane, and it is also ensured that the omni-directional wheel 2 can run normally on the bumpy road. That is, in a buffering process of the elastic component 32, an extreme position in the upward movement of the elastic component 32 relative to the casing 31 is that the bottom of the omni-directional wheel 2 and the bottom of the casing 31 are on the same horizontal plane. Specifically, in the present invention, an internal screw thread is disposed in the sleeve 3222, an external screw thread is disposed at the bottom 3212 of the movable shaft to cooperate with the sleeve 3222, and the sleeve 3222 is connected to the screw thread of the movable shaft 321. The movable shaft 321 is fixedly connected to the limiting movable block 322 through the screw thread. A distance between the limiting movable block 322 and the second step-like surface 317 of the casing 31 is a distance in which the omni-directional wheel 2 can move up and down in a vertical direction, and the elastic element 323 has a buffering effect on the omni-directional wheel 2 to ensure that the entire walking aid moves stably. Specifically, the elastic element 323 in the present invention is a compression spring.

Only exemplary embodiments of the present invention are described above. However, the present invention is not limited thereto. All modifications, equivalent replacements, and improvements made without departing from the spirit and principle of the present invention shall fall within the protection scope of the present invention.

What is claimed is:

1. A walking aid, comprising a support frame, with a plurality of support legs disposed at a bottom of the support frame, and omni-directional wheels disposed on the support legs, wherein a buffering structure is further disposed between each support leg and each omni-directional wheel, and the buffering structure comprises a casing for interacting with the bottom of the support leg and an elastic component that is disposed in the casing and fixedly connected to the omni-directional wheel, wherein
   the elastic component comprises a movable shaft inserted in the casing, a limiting movable block that is fixedly disposed at one end of the movable shaft and fixedly connected to the omni-directional wheel, and an elastic element that is disposed between the movable shaft and the limiting movable block,
   a first channel for the movable shaft to pass through is disposed in the casing, the movable shaft is inserted in the first channel, and a butting top surface is disposed on the top of the movable shaft, wherein the butting top surface butts a top surface of the casing,
   a second channel connected to the first channel and a third channel connected to the second channel are further disposed in the casing, wherein a first step-like surface is formed between the second channel and the first channel, a second step-like surface is formed between the second channel and the third channel, and the limiting movable block comprises a movable block that is disposed in the third channel and capable of butting the second step-like surface, and a sleeve that is vertical to the movable block and disposed in the second channel, wherein one end of the movable shaft is fixedly disposed in the sleeve, and a shaft lever of the omni-directional wheel is fixedly disposed in the sleeve.

2. The walking aid according to claim 1, wherein a connecting end for cooperating with the support leg is disposed on the top of the casing, wherein the connecting end is inserted in the support leg.

3. The walking aid according to claim 1, wherein the elastic element is disposed in the second channel and surrounds the movable shaft and an exterior of the sleeve of the limiting movable block, wherein one end of the elastic element butts the first step-like surface, and the other end butts a top surface of the movable block.

4. The walking aid according to claim 1, wherein the elastic element is a compression spring.

* * * * *